Jan. 4, 1944.                J. VAN ACKEREN                2,338,675
                              COKE-OVEN DOOR
                        Filed Aug. 13, 1941         6 Sheets-Sheet 1

INVENTOR.
JOSEPH VAN ACKEREN.
BY Henry Love Clarke
his attorney

Jan. 4, 1944.  J. VAN ACKEREN  2,338,675
COKE-OVEN DOOR
Filed Aug. 13, 1941   6 Sheets-Sheet 2
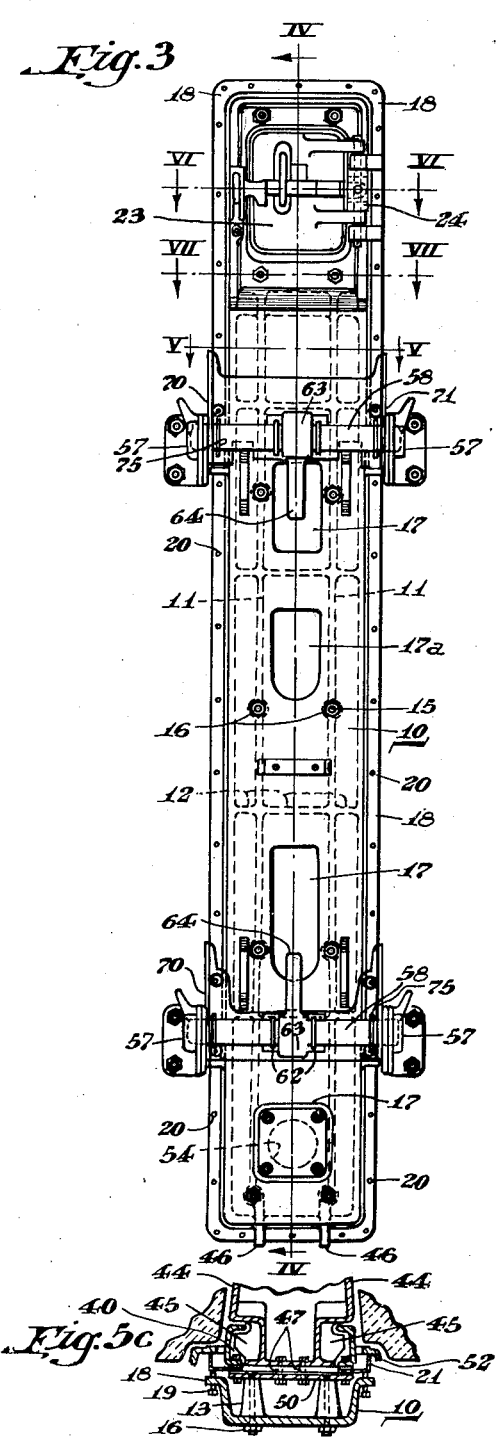
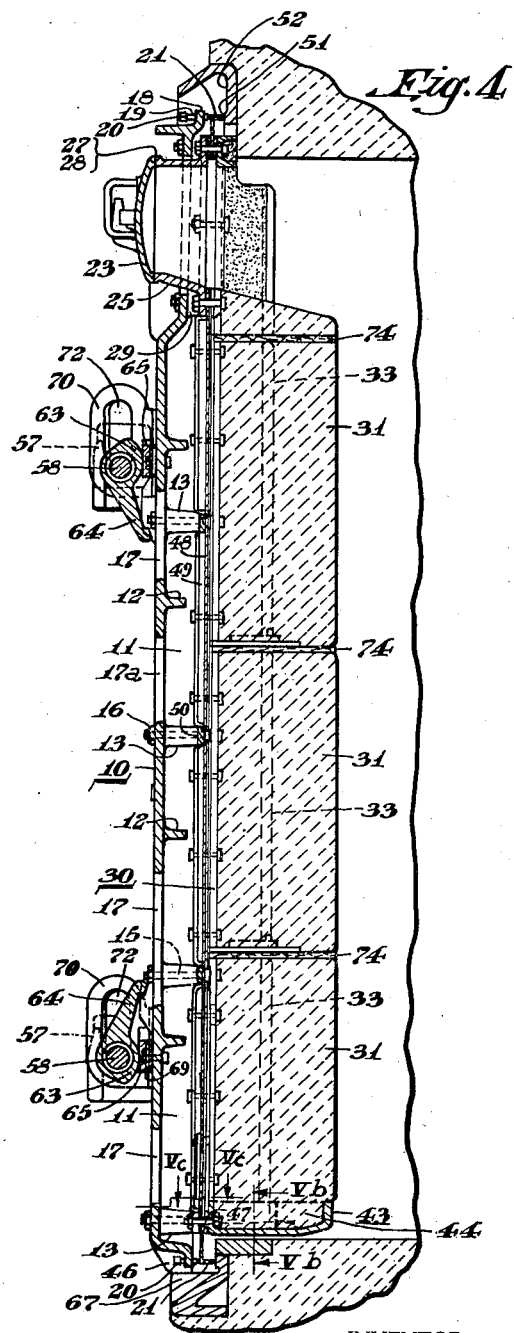
INVENTOR.
JOSEPH VAN ACKEREN.
BY Henry Love Clarke
his attorney

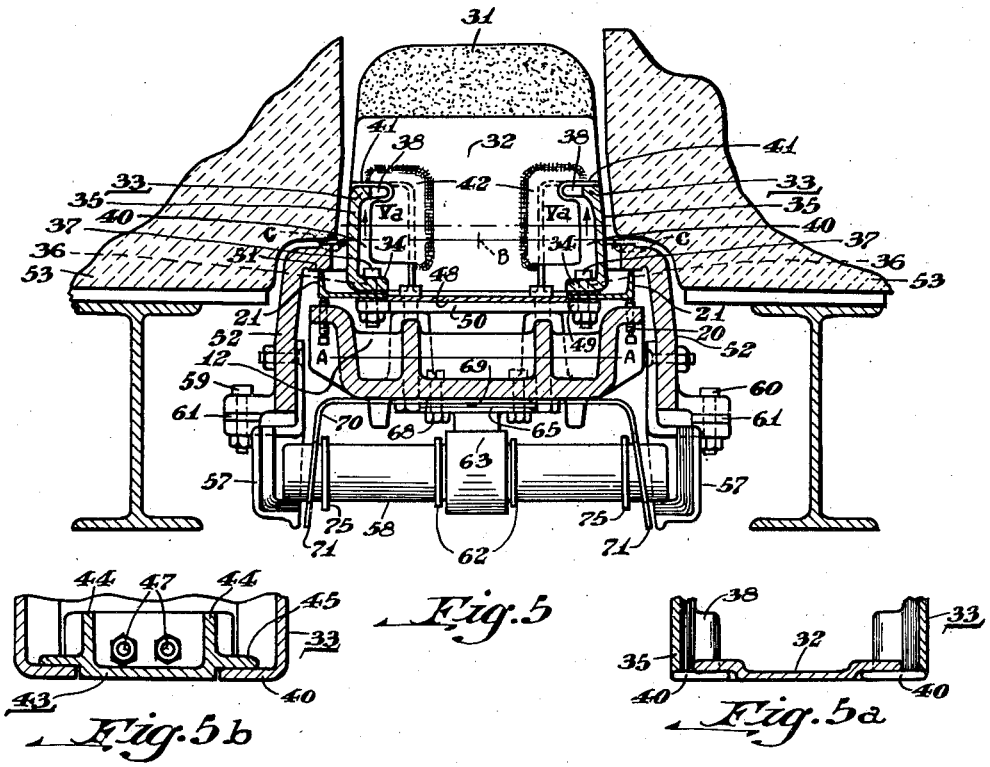
Fig. 5
Fig. 5b
Fig. 5a
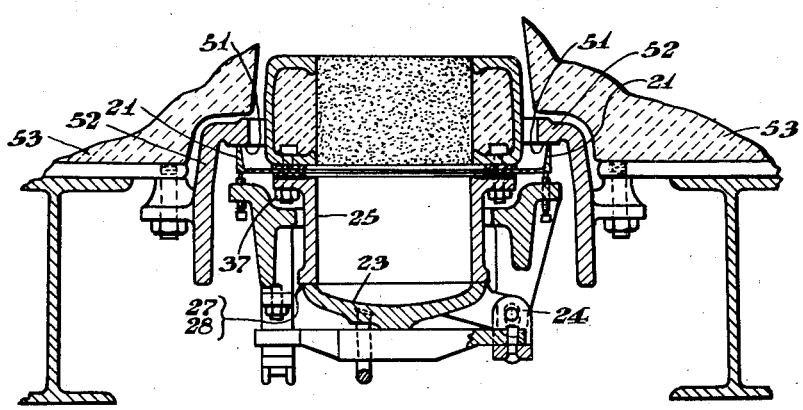
Fig. 6
INVENTOR.
JOSEPH VAN ACKEREN.
BY Henry Love Clarke
his attorney Jan. 4, 1944. J. VAN ACKEREN 2,338,675
COKE-OVEN DOOR
Filed Aug. 13, 1941 6 Sheets-Sheet 4
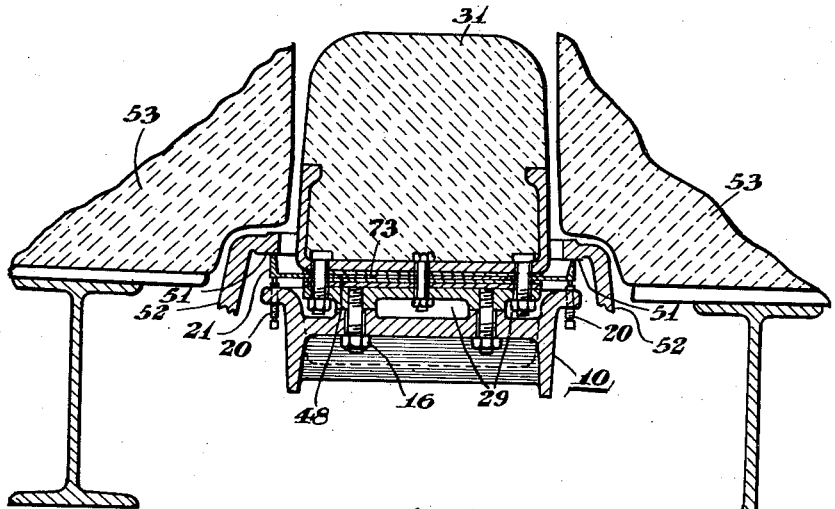
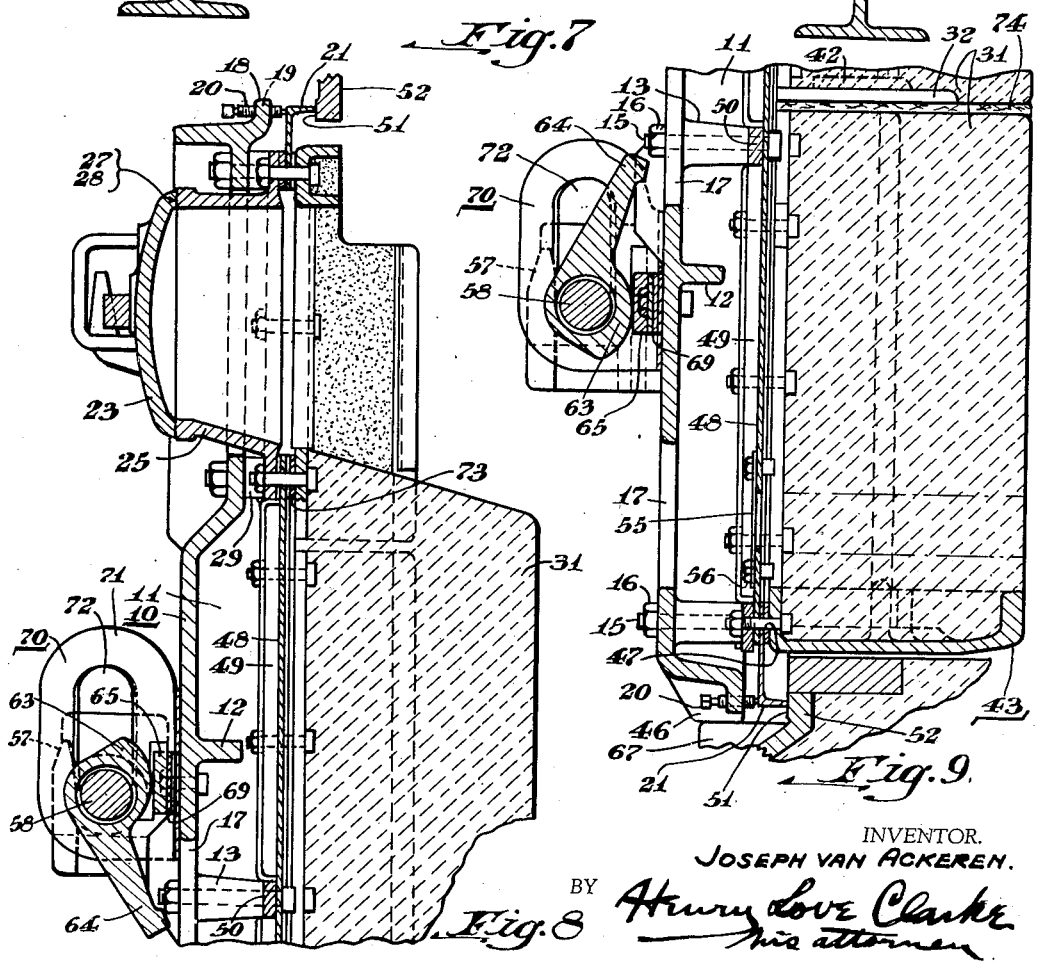
INVENTOR.
JOSEPH VAN ACKEREN.
BY Henry Love Clarke
his attorney Jan. 4, 1944.   J. VAN ACKEREN   2,338,675
COKE-OVEN DOOR
Filed Aug. 13, 1941   6 Sheets-Sheet 5
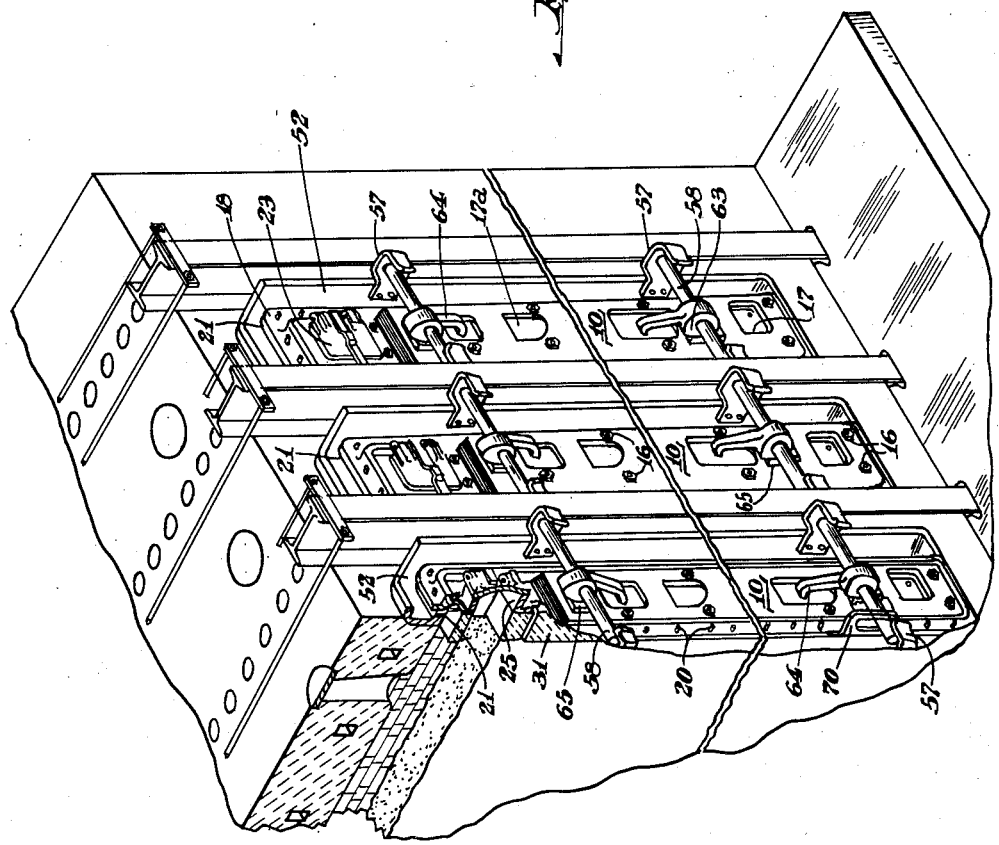
INVENTOR.
JOSEPH VAN ACKEREN.
BY Jan. 4, 1944.  J. VAN ACKEREN  2,338,675
COKE-OVEN DOOR
Filed Aug. 13, 1941  6 Sheets-Sheet 6

INVENTOR.
JOSEPH VAN ACKEREN.
BY *Henry Love Clarke*
his attorney

Patented Jan. 4, 1944

2,338,675

UNITED STATES PATENT OFFICE 2,338,675

COKE-OVEN DOOR

Joseph van Ackeren, Pittsburgh, Pa., assignor to Koppers Company, a corporation of Delaware Application August 13, 1941, Serial No. 406,653

10 Claims. (Cl. 202—248)

The present invention relates to improvements in coke-oven doors of the self-sealing type that are employed for closing the ends of coking-chambers of horizontal coke ovens, and comprehends such improvements in their design and manufacture as not only adapt them better to withstand the severe conditions to which they are subjected in coke-oven operation but also reduce their costs of production and facilitate their maintenance and promote the durability of their adjustments.

Amongst the objects of the present invention is the provision of a self-sealing coke-oven door comprising an inner refractory plug-portion, a yieldable sealing member that is adapted to co-operate with a door-frame surrounding a mouth of a coking-chamber to establish a metal-to-metal seal therefor, and a rugged metallic outer door-supporting back, all rigidly interconnected in a novel fashion that improves the degree of balance between the said features and that utilizes their structural materials with a high degree of efficiency to resist stresses to which the door as a whole, and the door-supporting back as a component part thereof, are subjected during oven operation.

A further object of invention is the provision of a novel and practical design of coke-oven door whereby its above-mentioned features are especially conveniently alignable and assemblable into, and replaceable in, a rigid door-unit and from which the door-supporting back is independently removable without deranging or dismantling its other said features, and wherein the said door-back is substantially completely out of direct contact with other door members that are directly subjected to the high temperatures of the coking-chambers and heating walls.

A further object of invention is to provide, for coke-oven doors, such improved designed and arrangement therein of a metallic door-supporting back that this structural feature functions as an insulating shield to protect the other features of a door-unit from fluctuations of temperature occasioned by ambient air and also operates to decrease heat losses from coking-chambers below those caused by coke-oven door constructions of the prior art, the said design also making it feasible, without sacrifice of strength, to reduce the distance between the door-supporting back's extreme fibers (i. e., inner and outer extremities) and, in consequence, the employment of one having a relatively shallower contour that reduces the space required for its accommodation in a coke-oven battery.

Further objects of invention are the provision of an improved leveller-door construction and of importantly simplified and cheaper means whereby a coke-oven door can be grasped for handling and can be latched in operating position in the oven mouth with regulable pressure against the door-frame.

The invention has for further objects such other improvements and such other operative advantages or results as may be found to obtain in the methods or apparatus hereinafter described or claimed.

A self-sealing coke-oven door constructed according to the principles of the instant improvement has its structural materials disposed in accordance with the basic principles of the well-known I-beam wherein the resistance of the comprising structural materials to flexing forces is enhanced by removing them from the neutral axis, at which point their resisting moment is lower, and disposing them at a distance from said axis where, in consequence of their higher moment of inertia which increases as the square of the distance, the said structural materials are employed more efficiently because of the greater force they exert in that relative location. Thus, in the instant novel coke-oven door the inner lining of refractory material along with the metallic liner-retainers therefor and such other features directly associated therewith, as the yieldable sealing member, are formed as a composite flange located at the one side of the door, the connecting means for holding this composite flange rigidly to the outer door-supporting back constituting the web portion of the I-beam, and the improved door-supporting back itself, which extends across the front of the door to at least substantially the edge of the flexible sealing member, forming the other flange of the I-beam. This novel design contributes per se to a coke-oven door constructed according to its principles that basic ruggedness and structural resistance to flexing forces that are inherent to an I-beam arrangement of materials in general.

The improved door-supporting back of invention resembles in its structural arrangement a sort of "turtle-back" or novel, composite T-beam that is itself formed and is also assembled into a door-unit in a manner consistent with the physical law that the resisting moment of the material of a structural form increases as its distance from the neutral axis is increased; and, as will be apparent from the hereinafter-given description, the said improved door-supporting back is itself a beam that has a high proportion of its metal relatively remote from its own neutral axis and its disposition in the assembled door-unit is such that its said neutral axis is located more closely adjacent the center of gravity of the door-unit than is the main portion of its metallic mass. Thus, the subject of the invention is essentially a coke-oven door that, viewed in its entirety, has its comprising features assembled according to the I-beam principle of material distribution, the natural strength of such a structural form being further enhanced by an internal beam construction that makes it advantageously feasible for a door constructed according to its pattern to withstand a greater force with a given quantity of material or to resist a given force with a lesser quantity thereof; its pattern may be conceived as a "double-beamed" or a "beam-within-a-beam" construction.

Consistent, then, with the above-given brief description of its general structural arrangement, the present improved coke-oven door comprises structurally three primary parts; namely, a rugged outer door-supporting back that spans the entire door, a therewith somewhat less extensive inner plug-portion comprising massive refractory material, and connecting means that are adapted for mutually rigidly supporting these two features in spaced relationship in such manner as to accord an I-beam contour to sections taken transversely of the whole.

The novelly-shaped member constituting the supporting-back for the oven-door simulates a "turtle-back" that has a flat outwardly-embossed or convexed portion which, in the assembled door-unit, is disposed at the battery face, and its side-walls, which extend some distance inwardly from the flat surface of this embossed portion, terminate in a marginal flange that extends entirely around said door-back. This marginal flange is provided at spaced intervals with threaded bores for holding those bolts whereby pressure-adjustments are made on the yieldable sealing member that is itself independently supported on the plug-portion a distance inwardly therefrom. Strengthening ribs for the door-back are formed, in a grid-like pattern, on the inner deeply-concave side of the "turtle-back" with which they are integral and stop somewhat short of the inner surface of its marginal flange. At spaced intervals along the longitudinally-disposed of these inner strengthening ribs, there are formed circular truncated bosses that project a short distance thereabove and are perforated each by a bore for the passage of heavy bolts whereby the "turtle-back" is rigidly attached to the plug-portion of the door-unit. The said bolts, for this purpose, are affixed to the plug-portion of the oven-door and project above its outer surface in pairs of which each member is located, between the longitudinal median and the periphery of the door, at a point where it registers with a corresponding bore in a boss of the "turtle-back." In combination with the above-mentioned longitudinal strengthening ribs of the "turtle-back," these co-acting bolts form the web-like connecting means between the massive embossed portion of the "turtle-back" and the heavy plug-portion of the oven-door, the two latter door-portions being spaced apart somewhat more than the height of said strengthening ribs. The so-formed continuous and relatively deep interspace, between these two spaced door-portions, is of important advantage, as will be hereinafter set forth, in providing cool outer door-surfaces that reduce heat losses from the coking-chamber and promote both length of life of an oven door and the persistence of its sealing adjustments.

The door's plug-portion, i. e., those of its elements located on that side of the strengthening ribs of the door-supporting back opposite its own vertical face, comprises, the usual massive lining of refractory material, metallic liner-retainers for supporting the same, the yieldable sealing member that extends around the periphery of the plug-portion, and, in addition, a plurality of both vertically- and of horizontally-disposed metallic bars. The former of these metallic bars serve for the bolting together into a unit along with a thin clamping sheet, the said yieldable sealing member, and the liner-retainers, whereas the latter of said bars serve the additional function of supporting, independently of the other of said elements of the plug-portion, those heavy bolts whereby the latter is attached through its strengthening ribs to the door-supporting back.

To provide for an energetic circulation of air around both the inner and outer surfaces of the "turtle-back," portions of its outwardly-convexed vertical face are cut away to form port-holes into which air can flow from the outside to replace that air caused to rise through the interspace between it and the plug-portion by heat conducted through the latter from the coking-chambers.

For latching the coke-oven door of the improvement in operating position in the mouth of a coke-oven, there is provided new and novel latch-bars, each comprising a heavy cylindric bar that supports a median cam-shaped section, of slightly larger diameter, which is rotatable independently of said bar by means of an integral handle. The cylindric bar is held in latch-hooks located on the door-frame surrounding the oven-mouth. By simple turning of the handled, cam-shaped section, it is possible to establish a requisite pressure, between said hooks and a special cam bearing-plate that is removably attached to the "turtle-back" for easy substitution when necessary, to hold the door in sealed position in the oven mouth.

The heavy frames of the leveller-doors provided on those oven doors for the pusher-side of the battery are each, according to the present improvement, attached to the metallic retainers in the plug-portion for holding a relatively thin strip of the refractory material disposed around the leveller-opening, said frames being thus out of contact with the "turtle-back" which is itself so formed adjacent thereto that currents of the cooling air, which continuously flow upwardly through the interspace between the "turtle-back" and the plug-portion, are directed around and over the surfaces of the leveller-doors and their frames, thereby advantageously serving to effect a quick dissipation of the heat which the leveller-doors and metallic parts thereadjacent continuously absorb directly from the heating walls of the ovens and from the burning gases given off by the freshly charged coal during the oven-charging and levelling periods.

In the accompanying drawings forming a part of this specification and showing for purposes of exemplification a preferred apparatus and method in which the invention may be embodied and practiced but without limiting the claimed invention specifically to such illustrative instance or instances:

The first sheet thereof shows a partially disassembled perspective view of the coke-oven door of the present invention, Fig. 1 showing an inside view of its "turtle-back" outer supporting member and the thereto attached leveller-door, and the Fig. 2 showing the plug-portion of the door with its massive lining of refractory, the liner-retainers, and the flexible sealing means that is attached to the latter and projects outwardly therebeyond around the entire edge of the door-unit;

Fig. 3 is a front elevational view of the assembled coke-oven door of Figs. 1 and 2 and shows the improved latch-bars therefor along with their latch-hooks that are attached to the door-frame surrounding the oven-mouth;

Fig. 4 is a vertical section taken along the line IV—IV of Fig. 3;

Figs. 5, 6 and 7 are enlarged horizontal sections taken respectively along the lines V—V, VI—VI and VII—VII of Fig. 3 and show in greater detail some of the features of the present improvement, the refractory material being removed on said Fig. 5 the more clearly to show the construction of its basal support;

Fig. 5a is a partial vertical section taken along the line Va—Va of Fig. 5 and showing in detail the arrangement of a basal support for a section of the refractory door-lining;

Fig. 5b is a vertical section taken along the line Vb—Vb of Fig. 4 and showing detail of the arrangement for supporting the bottom liner-retainer in the door-unit;

Fig. 5c is a horizontal section taken along the line Vc—Vc of Fig. 4 and showing additional detail of the door construction adjacent its lower part;

Fig. 8 is an enlarged view of the upper part of Fig. 4 showing more clearly the improved door's construction in the region adjacent the leveller-door frame and also one of the novel latch-bars employed to support the door in the coking-chamber mouth;

Fig. 9 is an enlarged view of the lower part of Fig. 4 showing details of construction of this door-portion;

Fig. 10 is a perspective view of a portion of a coke-oven battery equipped with a plurality of coke-oven doors that embody features of the present improvement;

The same characters of reference designate the same parts in each of the views of the drawings.

Figure 1:
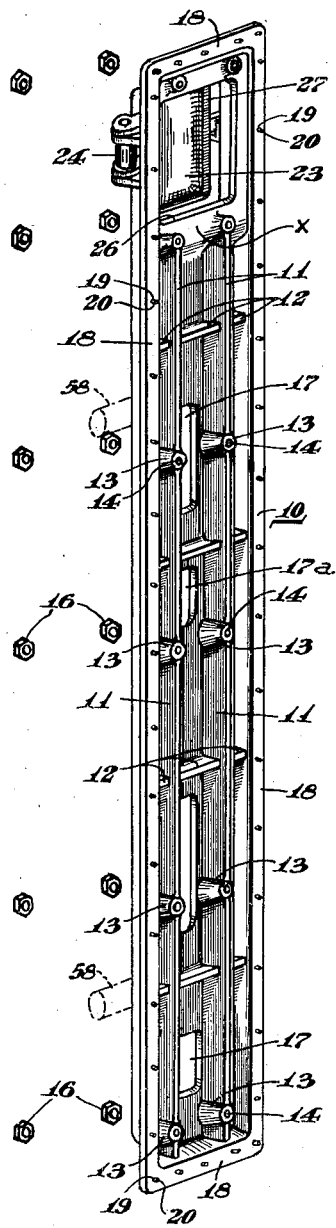
Figure 2:
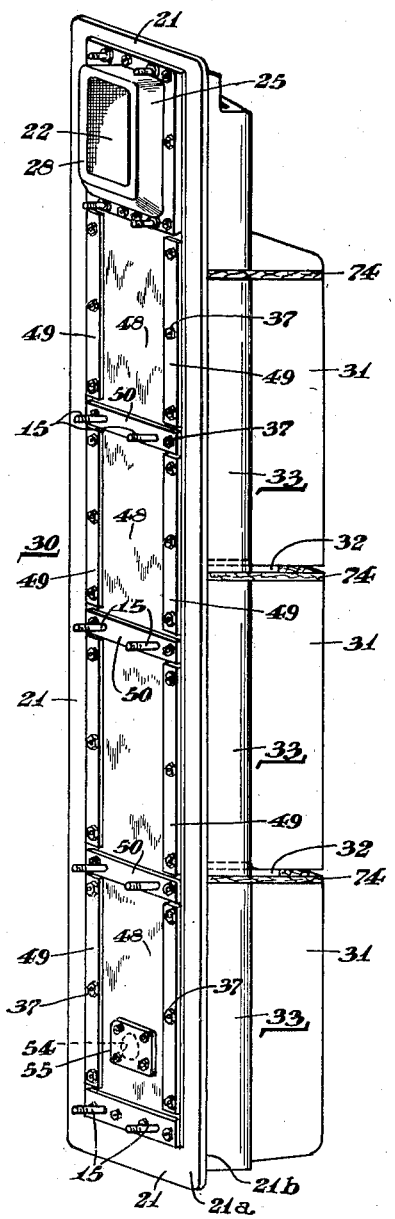

The invention will be more clearly understood by reference to the drawings and more especially to Figs. 1-4, inclusive, wherein detail of construction and relative arrangement of most of the door features are particularly apparent. The rugged outer "turtle-back" supporting member 10 which in the door assembly functions to carry all the other door parts and upon the structural resistance of which ultimately depends the permanency of shape and of retention of an existing adjustment of the flexible sealing member, has, as is manifest in Fig. 1, a sort of embossed or dished configuration. This member 10 is so assembled in a door-unit that its convex surface faces outwardly of the battery. The reverse or concave surface has integrally formed thereon perpendicularly-disposed longitudinal and transverse strengthening ribs, respectively 11, 12, the former of these expanding at spaced intervals therealong into frustum-shaped bosses 13 that are arranged in pairs. Extending entirely through these bosses are bores 14 through which are passed the similarly-spaced shanks of bolts 15, as shown in Fig. 2, and whereby the plug-portion of a door-unit is removably attached to the "turtle-back" member by means of a plurality of nuts 16 that are, in Fig. 1 for purposes of clarity, illustrated as removed into a plane behind the "turtle-back."

Along its vertical median, portions of the embossed section of the member 10 are cut away to provide several openings 17 of which the one designated as 17a is arranged in a position to receive the door-hook of a door machine for its handling during oven operations. For this purpose, the upper surface of 17a lies in a horizontal plane so as to facilitate maintaining the door plumb when supported by the door-hook. The said openings 17 primarily serve to facilitate flow of cooling outside air into the extensive interspace between the "turtle-back" and the plug-section of the assembled door unit, and for the purpose of promoting the movement of air up and around interior features of the assembled door, the free edges of both the longitudinal and transverse strengthening ribs 11, 12, stop somewhat short of contact with the plug-portion and thus provide through the door's interior, from top to bottom, a substantially uninterrupted flow-path for such cooling air.

Heavy flange 18 forms the rim of the "turtle-back" and extends around its entire periphery. At spaced intervals along this flange are threaded holes 19 each provided with a similarly-threaded adjusting bolt 20 having sufficient length that it can be turned to impress varying degrees of flexing pressure on the opposite adjacent portion of the flexible sealing member 21 which is itself independently bolted to the door's plug-portion.

Those of the present improved coke-oven doors that are designed for use at the pusher-side of the battery are each provided with an opening 22 through which a leveller-bar is insertable into the adjacent coking-chamber for levelling-off the charged coal. The leveller-door or closure 23 for this opening has a hinged support, 24, that is carried solely by the "turtle-back" and in its closed and latched position, the leveller-door is somewhat spaced from the main body of said member as is clearly apparent in Fig. 1. Door-frame 25 for the leveller-opening extends outwardly from door's plug-portion, to which it is affixed, with walls that are sloped sufficiently to permit its passage through the "turtle-back" at the opening 26 therein which has dimensions sufficiently larger than those of the leveller-door frame to permit the machined sealing surfaces of the leveller-door and the leveller-door frame, respectively 27, 28, to be brought into sealing contact and also to leave a sizeable space between the walls of leveller-door frame and the "turtle-back." By means of this novel arrangement, the "turtle-back" is advantageously relieved of any warping effect that the considerable weight of the leveller-door frame 25 would otherwise occasion and importantly reduces the quantity of heat that can reach the former from the latter. This is manifestly of importance for protection of the metal and the configuration of the "turtle-back" because, in operation, the leveller-door frame is directly subjected both to radiant heat from the gas-collecting space of the coking-chamber and normally to the combustion-heat of any gas escaping into the atmosphere during levelling operations when the leveller-door is swung open. It should also be further indicated that although, as is apparent by reference to Figs. 1 and 4, the concavity of the "turtle-back" is relatively shallow in the region X adjacent the leveller-door, it is of sufficient depth to provide in the assembled door-unit an interspace 29 wherethrough cooling currents of air that flow upwardly between the "turtle-back" and the plug-assembly can continue their course and flow over and around the leveller-door, its frame 25, and also the adjacent parts of the "turtle-back" to maintain them relatively cool and protect their contours from warping, such protection in the case more especially of the latter said parts promoting permanence of any adjustment of those pressure-screws that determine the configuration of the flexible sealing member.

As hereinabove mentioned, and as is clearly shown in Fig. 5, the neutral axis, A—A, of the "turtle-back" member 10, is disposed intermediate the outer vertical face thereof and the therewith parallel vertical plane, C—C, of the center of gravity, B, of the door unit. In such disposition, the bulk of the weight of the door-supporting back has a novel remoteness from its own neutral axis and from the center of gravity of the door-unit as a whole and in such arrangement has increased efficacy to resist external and internal stresses and promotes counterbalance between the door's comprising elements, while also providing a practical door-back of shallow contour that protrudes a shorter distance outside the battery-masonry.

The plug-portion 30 of the improved coke-oven door which is, as above stated, rigidly supported entirely by the "turtle-back" by means of the plurality of bolts 15, is clearly shown in assemblage in Fig. 2 and in greater detail in Figs. 4 to 9. The massive refractory lining of the door's plug-portion against which the coal of an oven charge is in direct contact, is preferably but not necessarily divided into sections 31 having each its individual metallic retainer means comprising a basal spanner-plate 32 and a lateral support 33 at each side thereof. The latter members resemble in configuration, as will be best comprehended by reference to Figs. 4, 5, and 5a, a modified heavy angle having a shorter and a longer leg, respectively 34, 35, the former being perforated with several spaced bores 36 for the passage of bolts 37. From the lower oven-side end of the longer said leg 35, there juts out a short rib 38 that is in substantial parallelism with the shorter angle-leg 34 and extends upwardly only a small fraction of the total height of a lateral support. At their lower ends, the said members 34, 35, and 38 are joined together with an integral web or bracket 40, and the said brackets of a pair of opposite lateral supports 33 serve to carry one of the removable spanner-plates 32 upon which directly rests the refractory of a door-plug section.

By means of deep notches 41, that are formed in bossed shelves 42 at either side of spanner plates 32 and are adapted to receive ribs 38 of said lateral supports 33, the spanner plates are removably keyed in fixed position at both their sides between said lateral supports for the refractory material, the bossed shelves being arranged to rest on the upper surfaces of webs 40 and serving to permit the lower surfaces of the spanner-plates to assume a position level with those of said webs.

That section 31 of refractory material at bottom of the door's plug-portion has a basal support 43 that is suitably modified from those employed for the other said sections thereabove to adapt it for its own particular position and function in the door unit, as is more particularly evident in Figs. 5b, 5c, and 9. It comprises a heavy, substantially plano-concave casting having rugged peripheral side-walls 44 and laterally-projecting wings 45 whereby it is in part supported by webs 40 of the lateral supports 33 therefor. When in operating position in a coking-chamber mouth, the nearly plane lower surface of this basal member 43 (its oven-side edge is slightly beveled and turned upward to facilitate introduction into the oven mouth and to protect the lower edges of the refractory from possible impact) is supported slightly above the oven-sole by a pair of runners 46 that are formed on the lower part of the "turtle-back" and are disposed to co-act to that end with a similarly-spaced pair thereof formed on the bottom part of the door-frame that surrounds the coking-chamber mouth. The member 43 is held firmly in position in the assembled door by means of bolts that pass through holes 47 in the back wall thereof and attach it to other door members, as will be hereinafter described.

The above-described leveler-door frame, the lateral and basal supports for the refractory material, and the flexible sealing member are all joined together in a unique and interesting manner to form the plug-portion of the coke-oven door of the invention, as will be now described with particular reference to Figs. 2, and 5 to 9, inclusive. The relatively thin clamping sheet 48 extends across and forms a large part of the outer surface of the plug-portion of the door. Structurally it contributes only in minor degree to the strength and resistance of this door-portion and it primarily functions to prevent escape from the coking-chamber of coal-carbonization products through fissures that may develop within the body of the refractory material or between the same and its metallic supports. With the exception of the upper part of the coke-side door, the above-mentioned metallic parts of the door's plug-portion are secured together by means of a series of vertical and a series of horizontal metallic bars, respectively 49, 50, and of bolts 37 whereby the former are held disposed in a grid-like pattern extending over the outer surface of the clamping sheet 48. As is clearly apparent, more especially in Figs. 2, 4, and 5, the said bolts 37 each pass outwardly, in the following sequence, through a bore 36 in the shorter leg of one of the metallic lateral supports 33 for the refractory material, through a therewith registered aperture near the inner edge of the flexible sealing member 21 and, finally, emerge through an aperture in one of either said vertical or said horizontal metal bars 49, 50, where on its threaded end a nut serves to draw said members together into gas-tight contact assisted by a yieldable, sealing ring-gasket located between the adjacent surfaces of the flexible sealing member 21 and the liner-supports 33, and by a coating of a fibrous adhesive applied between the outer surface of the former and the inner surface of the clamping sheet 48. At the upper part of the door for the pusher-side of a coke oven, the integral vertical and horizontal flanges of the leveller-door frame, 25, function in an manner analogous to said metallic bars 49, 50, in assembling thereadjacent features. The various said members comprising the plug-portion 30 of the novel coke-oven door are thus rigidly held in their respective, spaced locations by an exterior grill-work comprising easily removable and replaceable individual metallic bars—an arrangement which importantly facilitates the assembling of said members into a door unit and also the carrying out of localized repairs and adjustments. When the refractory material of the door's plug-portion is formed in a plurality of sections 31, as shown in Fig. 2, strips of wood 74 are employed to fill the space between them. During the heating-up period, this wooden filler is burned out as the plug-sections expand. Any void remaining after completion of expansion can be filled with a flowable cement.

Of the metallic clamping bars forming this grill-work on the exterior of the plug-section, the vertically-disposed ones, 49, serve solely as means for bolting together by means of bolts 37 adjacent surfaces of the liner-supports, of the flexible sealing member, of the clamping sheet, and their associated gasketing and sealing fibers. The horizontally-disposed clamping bars, 50, however, have structurally the additional function of supporting at their inner ends those heavy bolts, 15, whereby the door's plug-portion is affixed to the outer "turtle-back" supporting-member 10 and the two said members are assembled in spaced relationship into a door-unit. As is manifest more particularly from the drawings of Figs. 1 and 2, the contact between the said members 10 and 30 is substantially restricted to the limited vertical surfaces of bosses 14 and to the bolts 15 which themselves, in consequence, of their relatively small mass advantageously provide minimum opportunity for heat to reach the "turtle-back" member by conduction from the refractory material of the plug-portion, which is incandescent during oven operation. This is an important advance in the art of coke-oven doors that have the door-back and the plug-portion rigidly inter-connected, because the door-back is well-protected against reaching warping temperatures and the quantity of heat that can be lost from the coking-chambers through the outer door-surfaces is importantly reduced. Coke-oven doors constructed according to the present invention and employed during normal operation of a coke-oven battery of standard design showed temperatures of approximately 160 to 180° F. at the surfaces of the "turtle-back" members at respectively the pusher- and the coke-side of the battery, and temperatures of about 298° to 288° F. respectively in clamping sheet 48 forming the outer surface of a door's plug-portion. In contrast, the surfaces of the metallic door-backs of oven doors of the prior art, under substantially the same operating conditions, showed temperatures of about 275° F.

As is more clearly apparent in Figs. 4 and 5 the heads of heavy bolts 15, at the intermediate levels of the door, rest adjacent the inner face of clamping plate 48, their shanks each extending outwardly through a perforation therein and thence through a therewith registered aperture, in a horizontal clamping bar 50, that lies well inside of the inner periphery of the flexible sealing member 21. Those of said bolts 15 that are supported by the clamping bar 50 at the bottom of the door and those that are affixed to the upper and the lower horizontal flanges of the leveller-door frame 25 do not extend through apertures in clamping sheet 48 as do those above-described bolts 15, at the intermediate door levels, but are solely supported by the said members to which they are attached, those in the former location having their heads countersunk flush with the inner surface of the bottom horizontal bar 50, as shown in Fig. 5c, whereas those held in the flanges of the leveller-door frame (see Fig. 7) are studded thereinto by threaded sections on their inner ends. Thus, none of the assembly bolts 15 or 37 for the door has a common function and the "turtle-back" and the flexible sealing member 21 are assembled into a door unit, the one independently of the other. Filler plate 73, of Fig. 7, fills the space between inner edges of flexible sealing member 21 at this location, so that the intermediate of the bolts 37 passes through the same thickness of material as the other two bolts in assembling the door elements.

Figure 13:
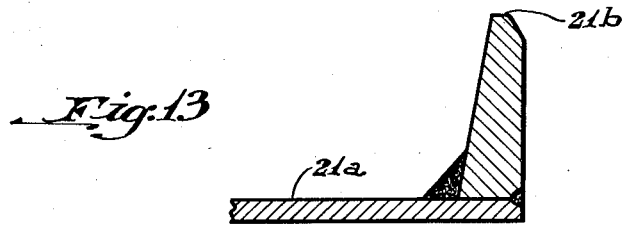
Fig. 13 is a section taken along the line XIII—XIII of Fig. 12 showing the location of the welds employed in forming the arcuate corners of the sealing edge.
Figure 12:
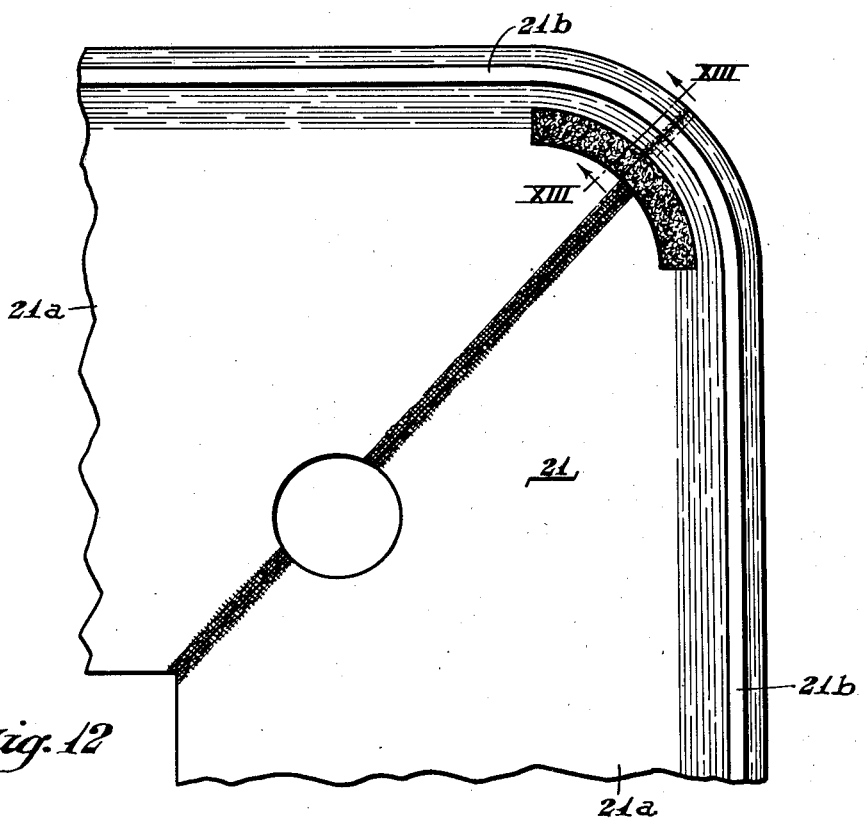
Fig. 12 shows an enlarged view of a mitered corner of the flexible sealing member and the arcuate form of its sealing edge at that location.
Figure 11:
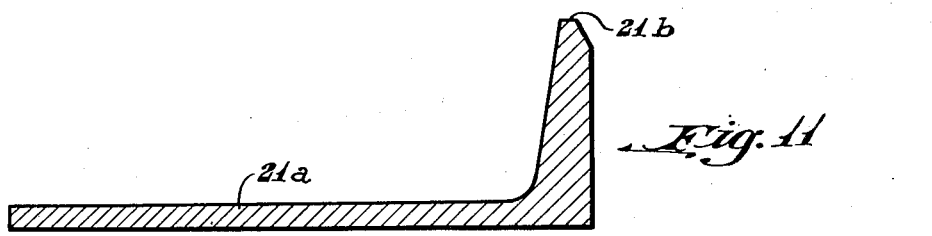
Fig. 11 is a section taken through a standard [-iron that has been adapted for constructing the flexible sealing member of the improved coke-oven door by removal of one of its flanges, the remaining flange having been ground at its outer part to provide the actual sealing edge.

The flexible sealing member 21, that extends around the periphery of the plug-portion of the door and juts beyond the refractory material thereof, comprises a web-like portion 21a having spaced perforations whereby it is assembled into the plug-portion of the door by means of bolts 37 and also having projecting therefrom at substantially right angles a beveled metallic edge 21b that is disposed to press against a machined surface 51 of the usual door-frame 52, which is itself located at the mouth of a coking-chamber and is continuous around the entire edge thereof, the said flexible member functioning to close the space between the liner-retainers of the door and the jamb-bricks 53 at the end of the coking-chamber heating walls, and thus to seal the oven against loss of distillation products. The said member 21 is simply fashioned from a commercially obtainable rolled section of 6" L-iron (Fig. 11), one flange thereof being removed while the other serves as the actual sealing edge after its outer free surface has been ground down at an angle of about 60° to the web portion to form a contact surface that is about one-eighth inch in width. The rounded corners (Fig. 12) at the welded junction between a horizontal and a vertical length of the sealing member are easily formed by first cutting off each of their to-be-mitered ends at an angle of 45°, then slitting the flange-portion, 21b, from the web-portion, 21a, to a short distance back from each of the so-formed ends so that the former (21b) can be bent independently of the latter (21a), thereafter welding the mitered ends of the web-portions (21b) together to form a right-angled joint, and then bending the adjacent loose ends of the flange-portions to meet and form a 90° arc, followed by welding together their contiguous bent-ends as well as (Fig. 13) also the slitted portion of the flanges to the web-portion.

In the plug-portion 30 of the oven door, a heating-up hole 54 is provided opposite the lowest opening 17 in the "turtle-back" member. This hole extends through clamping sheet 48 and the massive refractory material of the plug-portion and is employed to introduce, from the outside, heating-up gas into the interior of the associated coking-chamber during the time its masonry is being heated to operating temperature. After serving such purpose, this heating-up hole is sealed by insertion of a preformed plug of refractory material and then covered with closure plate 55 that is supported by bolts 56 (Fig 9).

For supporting the above-described improved coke-oven door in the mouth of the coking-chamber, there is provided latch-hooks 57 and the novel latch-bars 58. The former are removably mounted on door-frames 52 by means of bolts 59, 60, and shims 61, the latter serving to regulate by their chosen thickness the distance from the outer latch-hook surface, i. e., that surface thereof against which a latch-bar bears in closed position of the door, to the machined sealing surface 51 of a door-frame. As hereinbefore mentioned, latch-bar 58 comprises a cylindric bar having rotatably mounted thereon by means of a pair of collars 62 a cam 63 formed with an integral handle 64 for the purpose of its rotation. When latch-bar 58 is cradled in latch-hooks 57 and it is desired to seal the coking-chamber by bringing the sealing edge, 21b, of flexible sealing member 21 into pressure-contact with machined surface 52 of the door frame, the same is effected by simply turning handled cam 63 in that direction which causes its outer surface to bear with increasing pressure against the raised surface of cam bearing-plate 65, thereby pressing the door along its runners 46, which are formed integrally with the "turtle-back," over a similarly-spaced pair of skids 67 that are formed on the lower edge of the door-frame, and into the oven mouth. In effect, the cam member operates to increase the distance between the latch-bar and the main body of the door. The pressure of the sealing edge against the door-frame can thus be easily regulated by the amount of pressure impressed on the cam-handle which can manifestly be operated either manually or mechanically.

The cam bearing-plate 65 is mounted on the outer surface of the "turtle-back," 10, by a plurality of bolts 68 (Fig. 5); abrasion and wear on the bearing surface of said plate can be compensated by increasing the thickness of shim 69 located therebetween and the "turtle-back." Likewise, as is obvious, the distance between the bearing surfaces of plate 65 and door-hook 57 can be varied and adjusted by appropriate choice of thickness of shims 61, 69, to increase or diminish the same, and the effective sealing pressure provided by a given angularity of movement of cam 63 can be thereby respectively decreased or increased.

As is obvious from the drawings, the above-described latch-bar means, 58, is not structurally integral with the coke-oven door but is separately lowered into position in latch-hooks 57 after the door is inserted into the mouth of the coking-chamber. It is an extremely simple and effective arrangement for the purpose, is advantageously cheap to construct, and dispenses with highly intricate and expensive devices previously employed for attaching coke-oven latch-bars to the doors themselves and for moving them in a horizontal plane relative to the body of the door. Although these latch-bars lend themselves simply to manual operation, in large-scale modern operations, mechanical means for their manipulation are preferred, and so for their use in present practice, there has been developed a power-driven mechanism that is propelled by the door-handling machine to actuate the cam member and to lift the latch-bar out of the latch-hooks and to return it thereto during the operations of respectively removing the oven-door from and returning it to the coking-chamber mouth; and this latch-operating mechanism is being made the subject of another patent application of Paul H. Lavely, Serial No. 425,699, filed Jan. 5, 1942.

To provide against the eventuality that during their manipulative operations the heavy latch-bars might be disengaged from their handling supports, keeper 70 is provided to prevent their falling. This keeper, as is clearly shown in Figs. 5 and 6, comprises a U-shaped strip of sheet metal that is bolted to the outside of the "turtle-back" 10 by the same bolts 68 whereby cam bearing-plate 65 is supported. Its outwardly extending ends 71 are spaced apart a distance less than the over-all length of the associated latch-bar and each is provided with vertically-disposed slots 72 of such height and width as permits the latch-bars freely to be lifted out of the latch-hooks and lowered into their seats therein. To prevent undue longitudinal movement of a latch-bar in said keeper 70, collars 75 are affixed to the latch-bar after it has been cradled in the keeper 70.

The invention as hereinabove set forth is embodied in particular form and manner but may be variously embodied within the scope of the claims hereinafter made.

I claim:

1. A plug door for a horizontal coke oven chamber with a doorway at one end of the oven chamber and a sealing surface at the margin of the doorway, said door comprising: a metallic closure panel means adapted to normally close the space within the margin of the doorway in the closed position of the door; an inner plug lining of refractory material carried by the closure panel means for extension into the doorway; and an outer metallic cover for the closure panel means adapted to confront and enclose substantially the entire outer area of the closure panel means; said metallic cover being rigidly affixed to the closure panel means so as to be both out of structural heat-conducting contact therewith and spaced therefrom so as to form an air-flow cooling chamber, open to the atmosphere, between the inside of the cover and the outerside of the closure panel means, for free ascension of cooling air therethrough over the outerside of the closure panel means and the inside of the cover for the closure panel means.

2. A plug door for a horizontal coke oven chamber with a doorway at one end of the oven chamber and a sealing surface at the margin of the doorway, said door comprising: a metallic closure panel means adapted to normally close the space within the margin of the doorway in the closed position of the door; an inner plug lining of refractory material carried by the closure panel means for extension into the doorway; and an outer metallic cover for the closure panel means comprising a substantially flat plate-like portion that confronts and encloses substantially the entire outer portion of the area of the closure panel means that is lined on its inner side by the plug, and marginal side walls extending inwardly from the plate-like portion toward the closure panel means so as to be in a plane between the sides of the plug lining and the margin of the doorway; said metallic cover being rigidly affixed to the closure panel means out of structural heat-conducting contact of the plate-like portion and its side walls with the closure panel means, and said substantially flat plate-like portion being so spaced from the closure panel means as to form an air-flow chamber, open to the atmosphere, between the inside of the cover and the outside of the closure panel means, for free ascension of cooling air therethrough, over the outerside of the closure panel means and the inside of the cover for the closure panel means.

3. A coke oven door as claimed in claim 1, and in which the cover is provided with port-holes for circulation of air from the outer atmosphere into and through the air-flow chamber under natural draft induced by the heat of the door.

4. A coke-oven door comprising: an inner plug-portion comprising a metallic support carrying an inner plug lining of refractory material; an outer metallic cover for the plug portion that is exposed to the atmosphere and constitutes the main load carrying and supporting member for the door, said cover comprising a substantially flat plate-like portion that confronts and encloses the entire area of the outer portion of the plug-portion of the door, and side and top and bottom walls extending inwardly from the flat plate-like portion of the cover towards the plug-portion, in a plane surrounding the margins of the sides and top and bottom of the inner lining, thus forming an intermediate airflow cooling chamber between the inside of the cover and the outer side of the plug-portion of the door; means comprising structural elements of relatively minor mass rigidly affixing the metal cover to the plug-portion in spaced relationship such that the flat plate-like portion and inwardly extending walls of the outer cover are out of structural heat-conducting contact with the inner plug-portion; said intermediate air-flow cooling chamber being open to the atmosphere so that in operation of the door the outer surfaces of the plug-portion and the inner surfaces of said outer cover are traversed by freely ascending atmospheric air; and means between the plug-portion and the outer cover for sealing the joint between the mouth of a coking chamber and the plug-portion.

5. A coke-oven door as claimed in claim 4, and in which the inwardly extending walls of the cover are provided with a marginal flange in position for supporting means for adjusting pressure on a flexible self sealing member for sealing the joint between the mouth of the oven chamber and the door, and in which the sealing means is a flexible self sealing means.

6. A coke-oven door as claimed in claim 4, and in which the outer metal cover is constituted as a conchoidal cover with inner alternate elevations and depressions, and is structurally arched away outwardly from the plug-portion.

7. A coke-oven door as claimed in claim 4, and in which the sealing means is of the flexible self sealing type, and in which the plug-portion has means for removably affixing said self sealing means thereto, and in which the latter affixing means and the affixing means for the cover are separate and independent from each other, and the affixing means for the cover is so disposed as to be adapted for removal of the cover without disturbing the attachment of the flexible self-sealing means.

8. A coke-oven door as claimed in claim 4, and in which the inner plug-portion supports an outwardly-extending metallic leveller-bar frame for insertion of a leveller-bar into the top of an oven chamber to level a coal charge therein, and in which said leveller-bar frame projects through an opening in the top of the metal cover for the plug-portion, and in which the air-flow cooling chamber so communicates with the atmosphere that said leveller-bar frame is outwardly traversed by air that has inwardly traversed the air-flow cooling chamber as said air flows out from the air-flow cooling chamber.

9. A coke-oven door as claimed in claim 4, and in which the outer metal cover that constitutes the main load carrying and supporting member for the door, and the plug-portion are constructed so as to balance each other in weight, and in which the connecting means between the two is so distributed throughout the height of the door that the cover and the plug-portion counter-balance each other and are so disposed relative to each other and to the connecting means as to be built in accordance with the mass distribution principle of the double-flanged beam, that is the high proportion of the weight of the cover and the plug-portion being disposed relatively remote from each other.

10. A coke-oven door as claimed in claim 4, and in which the outer metal cover that constitutes the main load carrying and supporting member for the door, and the plug-portion are constructed so as to balance each other in weight, and in which the connecting means between the two is so distributed throughout the height of the door that the cover and the plug-portion counter-balance each other and are so disposed relative to each other and to the connecting means as to be built in accordance with the mass distribution principle of the double-flanged beam, that is the high proportion of the weight of the cover and the plug-portion being disposed relatively remote from each other, and in which the mass of said cover is so distributed that the neutral axis of the mass of the cover is intermediate the outer vertical face of said cover and the therewith parallel vertical plane of the center of gravity of the door when taken as a unitary whole.

JOSEPH VAN ACKEREN.